US012326954B2

(12) United States Patent
Markovics et al.

(10) Patent No.: US 12,326,954 B2
(45) Date of Patent: Jun. 10, 2025

(54) METHOD AND SYSTEM FOR IDENTIFYING DATA AND MANAGING ACCESS THERETO ACROSS MULTIPLE DATA PLATFORMS (71) Applicant: OWNBACKUP LTD., Tel Aviv (IL)

(72) Inventors: Matania Markovics, Netanya (IL); Daniel Hanga, Raanana (IL)

(73) Assignee: Own Data Company Ltd., Tel Aviv (IL)

( * ) Notice: Subject to any disclaimer, the term of this patent is extended or adjusted under 35 U.S.C. 154(b) by 206 days.

(21) Appl. No.: 18/077,243

(22) Filed: Dec. 8, 2022

(65) Prior Publication Data
US 2024/0193289 A1 Jun. 13, 2024

(51) Int. Cl.
G06F 21/62 (2013.01)

(52) U.S. Cl.
CPC ............... G06F 21/6218 (2013.01)

(58) Field of Classification Search
CPC .................................................. G06F 21/6218
See application file for complete search history.

(56) References Cited

U.S. PATENT DOCUMENTS

| | | | | |
|---|---|---|---|---|
| 10,366,250 | B1* | 7/2019 | Chen | G06F 21/6245 |
| 10,789,295 | B2* | 9/2020 | Long | G06F 16/2455 |
| 10,999,370 | B1* | 5/2021 | Schwartz | H04L 67/1095 |
| 2012/0324529 | A1* | 12/2012 | Rangachari | H04L 63/20 726/1 |
| 2017/0147631 | A1* | 5/2017 | Nair | G06Q 20/363 |
| 2017/0223026 | A1* | 8/2017 | Amiri | H04L 63/20 |
| 2017/0223057 | A1* | 8/2017 | Amiri | H04L 67/306 |
| 2017/0223138 | A1* | 8/2017 | Amiri | H04L 67/63 |
| 2018/0225471 | A1* | 8/2018 | Goyal | G06F 21/62 |
| 2018/0367506 | A1* | 12/2018 | Ford | H04L 63/0421 |
| 2019/0268379 | A1* | 8/2019 | Narayanaswamy | H04L 63/12 |
| 2020/0119906 | A1* | 4/2020 | Das | H04L 9/50 |
| 2020/0133955 | A1* | 4/2020 | Padmanabhan | G06Q 30/01 |
| 2020/0242129 | A1* | 7/2020 | Botev | G06F 16/273 |
| 2020/0302082 | A1* | 9/2020 | Carteri | G06F 21/6245 |
| 2021/0026879 | A1* | 1/2021 | Huang | G06F 16/3334 |
| 2021/0217001 | A1* | 7/2021 | Harrison | G06F 21/6218 |
| 2021/0248145 | A1* | 8/2021 | Parker | G06F 16/9024 |
| 2022/0058602 | A1* | 2/2022 | Krajewski | H04L 12/14 |
| 2022/0197926 | A1* | 6/2022 | Passey | H04L 63/101 |
| 2022/0198034 | A1* | 6/2022 | Rodriguez | H04L 9/30 |
| 2022/0198038 | A1* | 6/2022 | Passey | G06F 21/6209 |
| 2022/0417011 | A1* | 12/2022 | Shua | G06F 21/577 |
| 2023/0008975 | A1* | 1/2023 | Crudele | H04W 12/72 |

(Continued)

FOREIGN PATENT DOCUMENTS

CN 113434531 A 9/2021

OTHER PUBLICATIONS

Papadopoulos, Panagiotis, Nicolas Kourtellis, and Evangelos Markatos. "Cookie synchronization: Everything you always wanted to know but were afraid to ask." The World Wide Web Conference. 2019.*

(Continued)

*Primary Examiner* — Jimmy H Tran (74) *Attorney, Agent, or Firm* — Meitar Patents Ltd.; Daniel Kligler (57) ABSTRACT

Systems and methods automate access and permissions to sensitive data or privileged data, by various users or entities, such as those associated with an enterprise, across multiple platforms.

11 Claims, 8 Drawing Sheets

(56) References Cited

U.S. PATENT DOCUMENTS

| | | | | |
|---|---|---|---|---|
| 2023/0048011 A1* | 2/2023 | Mody | G06Q 50/60 | |
| 2023/0094081 A1* | 3/2023 | Hariri | G06F 16/176 | |
| | | | | 726/28 |
| 2023/0094648 A1* | 3/2023 | Yerfule | G06F 11/1469 | |
| | | | | 707/612 |
| 2023/0097739 A1* | 3/2023 | Fahrni | G06Q 10/063114 | |
| | | | | 705/7.15 |
| 2023/0121420 A1* | 4/2023 | Jain | H04L 63/108 | |
| | | | | 726/4 |
| 2023/0274371 A1* | 8/2023 | Crudele | G06Q 40/03 | |
| | | | | 705/30 |
| 2023/0388125 A1* | 11/2023 | Naschitz | H04L 63/12 | |
| 2024/0045838 A1* | 2/2024 | Reiss | G06F 9/547 | |
| 2024/0144248 A1* | 5/2024 | Barbar | G06Q 30/0201 | |
| 2024/0152584 A1* | 5/2024 | Jayaraman | G06F 21/31 | |
| 2024/0169007 A1* | 5/2024 | Gloege | G06F 16/9538 | |

OTHER PUBLICATIONS

Shafagh, Hossein, et al. "Droplet: Decentralized authorization and access control for encrypted data streams." 29th USENIX Security Symposium (USENIX Security 20). 2020.*

Pang, Candy, and Duane Szafron. "Single source of truth (SSOT) for service oriented architecture (SOA)." Service-Oriented Computing: 12th International Conference, ICSOC 2014, Paris, France, Nov. 3-6, 2014. Proceedings 12. Springer Berlin Heidelberg, 2014.*

Lorenz, David H., and Boaz Rosenan. "Managed Information: A New Abstraction Mechanism for Handling Information in Software-as-a-Service." arXiv preprint arXiv:2012.15382 (2020).*

AWS, "Overview of Amazon Web Services", pp. 1-3, Jun. 3, 2022 https://docs.aws.amazon.com/whitepapers/latest/aws-overview/introduction.html.

Salesforce, Inc., "What is SAAS", pp. 1-12, years 2000-2020 https://web.archive.org/web/20200920144004/https://www.salesforce.com/eu/learning-centre/tech/saas/.

McAndrews, "Workday Concept: SaaS", pp. 1-2, Jul. 30, 2014.

Servicenow, "What is SAAS subscription", pp. 1-3, year 2022 https://web.archive.org/web/20221002033459/https://www.servicenow.com/products/it-asset-management/what-is-saas-subscription.html.

Advanced Micro Devices Inc, "x86 SoC Technology", pp. 1-3, year 2018 https://web.archive.org/web/20180204034909/http://www.amd.com/en/technologies/x86-soc.

Wikipedia, "XEON", pp. 1-22, Sep. 6, 2022 https://web.archive.org/web/20221102172222/https://en.wikipedia.org/wiki/Xeon.

Wikipedia, "Pentium", pp. 1-14, Sep. 24, 2022 https://web.archive.org/web/20221021025435/https://en.wikipedia.org/wiki/Pentium.

International Application # PCT/IB2023/060709 Search Report dated Feb. 14, 2024.

* cited by examiner

| DATA BASE 1 - FINANCE | FIELD | PRIVILEGED |
|---|---|---|
| | CC# | YES |
| | CC ISSUER | YES |
| | IBAN | YES |
| | CREDIT SCORE | YES |
| | CC TYPE | YES |

| DATA BASE 2 - PII | FIELD | PRIVILEGED |
|---|---|---|
| | ACCT. NO. | |
| | ACCT. SOURCE | |
| | ACCOUNT NAME | YES |
| | MOBILE TEL NO | YES |
| | ADDRESS | |
| | EMAIL | |

| DATA BASE n - HIPPA | FIELD | PRIVILEGED |
|---|---|---|
| | PATIENT NAME | YES |
| | HOSPITAL | YES |
| | PRESCRIBED MEDICATION | YES |
| | HOSPITAL STAYS | YES |
| | INSURANCE PROVIDER | YES |

PLATFORM 1

| ACCT. NO. | ACCT. SOURCE | ACCT. NAME | MOBILE TEL. NO. | CC# | CC ISSUER |
|---|---|---|---|---|---|
| 1515 | Advertisement | Patrick Macombs | 816-999-1515 | 5625 6462 9785 | BOA |
| ... | ... | ... | ... | ... | ... |
| 3030 | Trade | Lionel Mossie | 212-888-3030 | 5897 5678 3711 | BNP |

FIG. 5B

PLATFORM 1

| ACCT. NO. | ACCT. SOURCE | ACCT. NAME | MOBILE TEL. NO. | CC# | CC ISSUER |
|---|---|---|---|---|---|
| 1515 | Advertisement | Patrick Macombs (520a) | 816-999-1515 (520c) | 5625 6462 9785 | BOA |
| ... | ... | ... | ... | ... | ... |
| 3030 | Trade | Lionel Mossie (520b) | 212-888-3030 | 5897 5678 3711 | BNP |

DATA ASSETS

FIG. 5C

PLATFORM 1

| ACCT. NO. | ACCT. SOURCE | ACCT. NAME | MOBILE TEL. NO. | CC# | CC ISSUER |
|---|---|---|---|---|---|
| 1515 | Advertisement | Patrick Macombs* | 816-999-1515* | 5625 6462 9785* | BOA* |
| ... | ... | ... | ... | ... | ... |
| 3030 | Trade | Lionel Mossie* | 212-888-3030* | 5897 5678 3711* | BNP* |

PLATFORM 1

| ACCT. NO. | ACCT. SOURCE | ACCT. NAME | MOBILE TEL. NO. | CC# | CC ISSUER |
|---|---|---|---|---|---|
| 1515 | Advertisement | Patrick Macombs * | 816-999-1515 * | 5625 6462 9785 * | BOA * |
| ... | ... | ... | ... | ... | ... |
| 3030 | Trade | Lionel Mossie * | 212-888-3030 * | 5897 5678 3711 * | BNP * |

PLATFORM 2

| CUSTOMER NAME | ADDRESS | EMAIL | EMERGENCY CONTACT | BANK REFERENCE | DESCRIPTION |
|---|---|---|---|---|---|
| Patrick Macombs | 1 Arrowhead Way, Kansas City, MO 64123 | PM15@example.chiefs.com | Andy Redd 816-444-5555 | BOA | Use Mobile Phone 816-999-1515 |
| Lionel Mossi | 10 Champs Elysees, Paris 24 FRANCE | LM30@example.psg.fr | David Bookman 305-777-6789 | BNP | All Charges to Credit Card No. 5897 5678 3711 |

PLATFORM 1

| ACCT. NO. | ACCT. SOURCE | ACCT. NAME | MOBILE TEL. NO. | CC# | CC ISSUER |
|---|---|---|---|---|---|
| 1515 | Advertisement | Patrick Macombs * | 816-999-1515 * | 5625 6462 9785 * | BOA * |
| ... | ... | ... | ... | ... | ... |
| 3030 | Trade | Lionel Mossie * | 212-888-3030 * | 5897 5678 3711 * | BNP * |

Permissions A,B,C,D

Permissions P,Q,R

PLATFORM 2

| CUSTOMER NAME | ADDRESS | EMAIL | EMERGENCY CONTACT | BANK REFERENCE | DESCRIPTION |
|---|---|---|---|---|---|
| Patrick Macombs * | 1 Arrowhead Way, Kansas City, MO 64123 | PM15@example.chiefs.com | Andy Redd 816-444-5555 | BOA * | Use Mobile Phone 816-999-1515 * |
| Lionel Mossie * | 10 Champs Elysees, Paris 24 FRANCE | LM30@example.psg.fr | David Bookman 305-777-6789 | BNP * | All Charges to Credit Card No. 5897 5678 3711 |

*FIG. 5F*

METHOD AND SYSTEM FOR IDENTIFYING DATA AND MANAGING ACCESS THERETO ACROSS MULTIPLE DATA PLATFORMS

TECHNICAL FIELD

The present disclosed subject matter is directed to managing data, and in particular, to managing permissions of users of a network to have access to various data.

BACKGROUND

Enterprises typically run multiple platforms. For example, an enterprise may run multiple Software as a Service (SAAS) platforms, where their regulated and sensitive data is stored. Between the various platforms, users, who do not have access to regulated and sensitive data on one of the enterprise's SAAS platforms, may have access to the same regulated or sensitive data on another different SAAS platform. Such unintended access may result in possible security and data breaches.

SUMMARY

The present disclosed subject matter provides visibility and control for regulated and sensitive data, hereinafter, referred to as "sensitive data", "sensitive data assets", "privileged data", or "privileged data assets", these terms used interchangeably herein, for a user and/or users, who have permission to access the data, such as the same data which is stored in different SAAS platforms by an enterprise.

This document references terms that are used consistently or interchangeably herein. These terms, including variations thereof, are as follows.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., a smartphone, personal digital assistant (PDA), mobile telephone or cellular telephone, a watch digitally linked to a network such as the Internet, or other wearable technology (also known as wearables), such as a digital watch, bracelet or wristband, or a Bluetooth headset or other networked headset.

A "server" is typically a remote computer or remote computer system, or computer program therein, or hosted by a cloud-based service (e.g., Amazon Web Services (AWS)) in accordance with the "computer" defined above, that is accessible over a communications medium, such as a communications network or other computer network, including the Internet. A "server" provides services to, or performs functions for, other computer programs (and their users), in the same or other computers. A server may also include a virtual machine or a software-based emulation of a computer.

The terms "n" and "$n^{th}$" are representative of the last member of a series or sequence of members, for example, servers, databases, computers, platforms, elements, with the series being definite or indefinite.

Unless otherwise defined herein, all technical and/or scientific terms used herein have the same meaning as commonly understood by one of ordinary skill in the art to which the disclosed subject matter pertains. Although methods and materials similar or equivalent to those described herein may be used in the practice or testing of embodiments of the disclosed subject matter, exemplary methods and/or materials are described below. To the extent of any conflict, the patent specification, including definitions, will control. In addition, the materials, methods and examples are illustrative only and are not intended to be limiting.

BRIEF DESCRIPTION OF THE DRAWINGS

The present disclosure will be more fully understood from the following detailed description of the embodiments thereof, taken together with the drawings, where like reference numbers and/or characters indicate corresponding or like elements, in which.

DETAILED DESCRIPTION OF EMBODIMENTS

Before explaining at least one embodiment of the disclosed subject matter in detail, it is to be understood that the disclosed subject matter is not necessarily limited in its application to the details of construction and the arrangement of the components and/or methods set forth in the following description and/or illustrated in the drawings. The disclosed subject matter is capable of other embodiments or of being practiced or carried out in various ways.

As will be appreciated by one skilled in the art, aspects of the present disclosed subject matter may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosed subject matter may take the form of a computer program product embodied in one or more non-transitory computer readable (storage) medium (s) having computer readable program code embodied thereon.

Throughout this document, numerous textual and graphical references are made to trademarks, and domain names. These trademarks and domain names are the property of their respective owners and are referenced only for explanation purposes herein.

Overview

The present disclosure provides systems and methods which automate the access and permissions of sensitive data or privileged data, by various users or entities (the terms "user (s)" and "entity/entities" used interchangeably herein), such as those associated with an enterprise. For example, an enterprise may use multiple Software as a Service (SAAS) platforms, such that the same user has the same permissions to the same data, across all of the enterprise's SAAS platforms.

An example process provides a user (or entity) with the same access to the same data, across all platforms of the enterprise. The process includes, for example, discovering the data assets the user has access and/or permission thereto, classifying the data assets, controlling access to the data assets, and suggesting the appropriate permission model for the data assets.

Discovering the assets data includes, for example, identifying the different types of data assets. Once identified, the data assets are located within each SAAS environment or platform of the enterprise accessible to the user.

Classifying the data asset includes, for example, organizing the data asserts according to different criteria, regulations and classification policies. This classification is typically performed automatically by computers.

Controlling access to the data assets includes, for example, normalizing permission models between the different platforms, such as SAAS platforms, and provide insights on which users can access which data assets on each platform, such as SAAS platforms and Cross SAAS platforms.

Suggesting includes, for example, selecting an appropriate permission model for the specific user to the specific data assets, and applying it across all platforms of the enterprise, which the user has access to.

The disclosed methods and systems operate on multiple platforms, such as SAAS platforms, with millions of data assets in the multiple platforms to be operated on. The operations include, for example, search, identification, isolation, and comparison operations for the data assets. These operations are, for example, a "Big Data" analysis, which includes, for example, analyzing and systematically extracting information from, or otherwise dealing with data sets, that are too large or complex to be dealt with by traditional data-processing application software and/or software tools, for example, by specialized computers (e.g., special purpose computers), including processors, computer hardware and/or software, to capture, curate, manage, and process data within a tolerable elapsed time, such as a short time period, on the order of seconds and in real time.

System Description

Figure 1A:
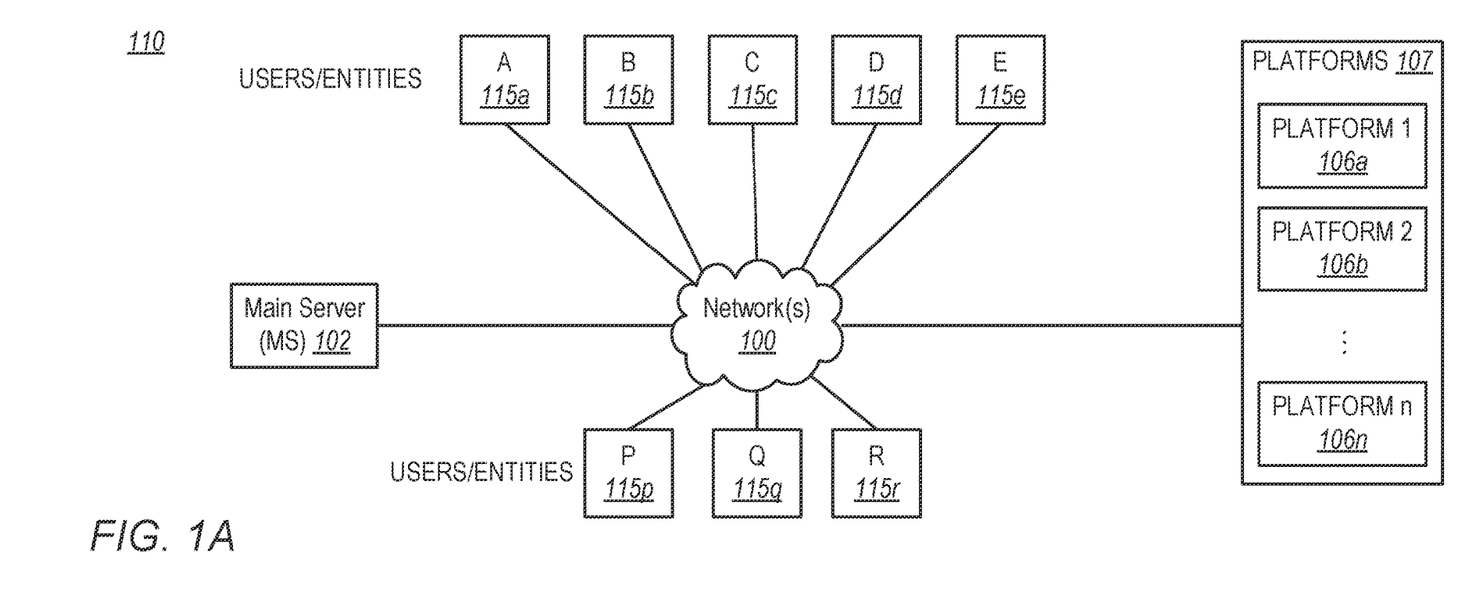
FIG. 1A is a diagram of an exemplary environment for the system in which embodiments of the disclosed subject matter are performed.

Reference is now made to FIG. 1A, which shows an example operating environment, including a network 100, to which is linked a main server (MS) 102, also known as a central server. While the main server 102 is shown, the main server 102 and/or portions thereof can also be hosted in a service in the cloud, e.g., Amazon® Web Services (AWS).

Accordingly, the description provided herein for the main server 102 applies also to cloud-based services.

The main server 102 also defines a system 102' (FIG. 2), either alone or with other computers, including servers, components, and applications, e.g., client applications, associated with main server 102, as detailed below. The system 102' links to platforms (Platform 1 to Platform n) 106a-106n (shown in one or more servers represented by the server 107), for example, SAAS platforms, such as Salesforce®, Workday®, Service Now®, which for example, may be run by an enterprise 110.

The main server 102, for example, is typically part of the enterprise 110 and links to the platforms 106a-106n either directly, or over the network 100, which, for example, is a local area network (LAN), also known as an enterprise network. Alternately, the main server 102 may link to the platforms 106a-106n over a communications network, such as a Wide Area Network (WAN), including public networks such as the Internet.

The network 100 may be a single network, such as the Internet or a LAN, including an enterprise network, but is typically a combination of networks (including, for example, the enterprise network) and/or multiple networks including, for example, combinations of the aforementioned networks, as well as cellular or Bluetooth or other networks. "Linked" as used herein includes both wired or wireless links, either direct or indirect, and placing the computers, including, servers, components and the like, in electronic and/or data communication with each other.

Figure 1B:
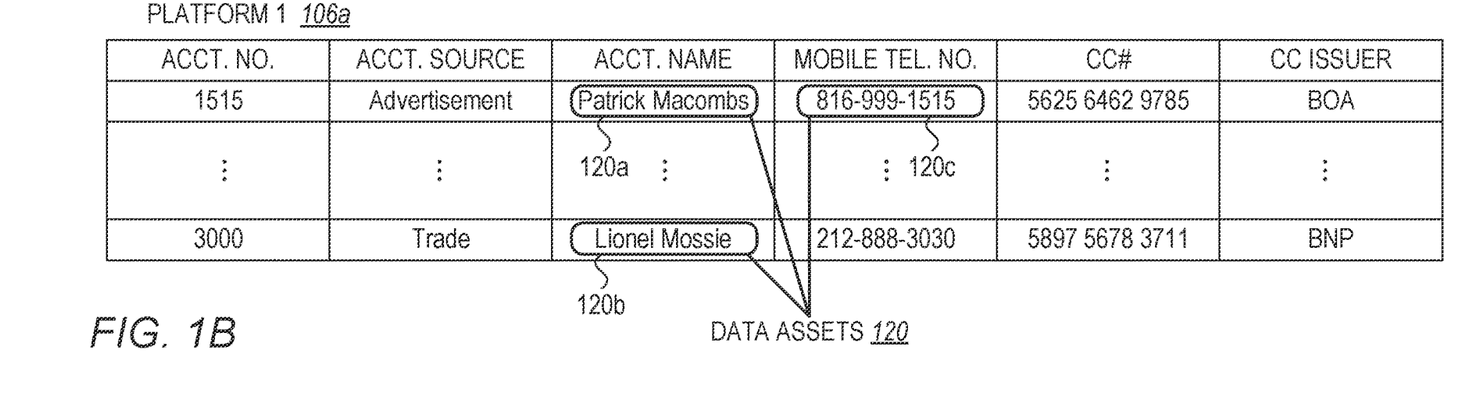
FIG. 1B is a diagram of an example portion of a data table in a database associated with a Software as a Service (SAAS) platform.

As shown in FIG. 1B, data assets 120 (120a, 120b, 120c for. explanation purposes), are identified from the data table (or portion thereof) from the platform, for example, Platform 1 106a. For example, each data asset 120 (e.g., 120a, 120b, 120c) is an atomic unit of data, which, for example, includes, an identification, such as a data asset name, a definition, one or more representation terms or content of the piece of data being held as the data asset, and a type for the data asset.

Users or entities A, B, C, D, E, and P, Q, R, represented by their computers 115a-115e and 115p-115r, link to the network 100, and accordingly, have access to the platforms 106a-106n, with various permissions for various data assets in the various platforms 106a-106n.

Staying in FIG. 1B and looking at the data asset "Patrick Macombs" 120a, it has an identification or field of "Account Name", is a data asset of a type "name", and the actual terms "Patrick" and "Macombs" are the representation terms or content of the data asset.

Figure 2:
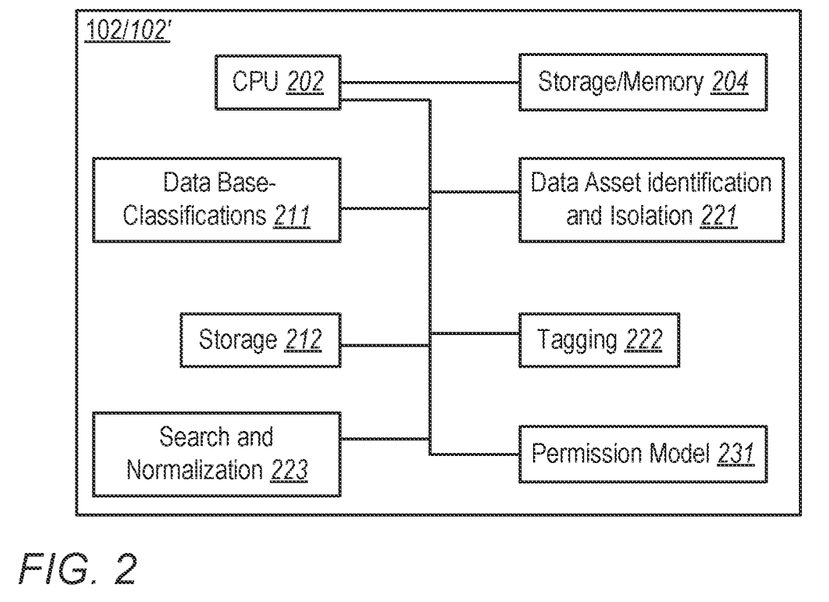
FIG. 2 is a diagram of the architecture of the main server of FIG. 1A and the system thereof, in accordance with embodiments of the disclosed subject matter.

Turning to FIG. 2, a system 102' architecture is shown. The system 102' is formed of components, including, for example, processors, storage media, databases, modules, and models, and the like, for providing numerous additional server functions and operations, and, for running the processes of the system 102' of the disclosure. The components which are germane to the disclosure are shown and described below. The main server (MS) 102 may be associated with additional storage, memory, caches and databases, both internal and external thereto. For explanation purposes, the main server (HS) 102 may have a uniform resource locator (URL) of, for example, www.example.ms-.com.

The central processing unit (CPU) 202 is, for example, formed of one or more processors, in communication with, i.e., either directly or indirectly, including in electronic and/or data communication, storage/memory 204. The CPU 202 also communicates with Databases 211 and storage media 212, as well as a data asset isolator, or isolation module 221, a tagger or tagging module 222, a searcher/normalizer or search and normalization module 223, and a permission model 231.

As used herein, a "module", for example, includes a component for storing instructions (e.g., machine readable instructions) for performing a process, and including or associated with processors of the CPU 202 for executing the instructions. All of the components 202, 204, 211, 212, 221, 222, 223 and 231 link to each other either directly or indirectly for direct or indirect communications with each other.

The Central Processing Unit (CPU) 202 is formed of one or more processors, including microprocessors, for performing the main server 102 and/or system 102' functions and operations detailed herein. Typically, the CPU 202, formed by the processors, comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory. The processors are, for example, conventional processors, such as those used in servers, computers, and other computerized devices, including hardware processors. For example, the processors may include x86 Processors from AMD (Advanced Micro Devices®) and Intel®, Xenon® and Pentium® processors from Intel, as well as any combinations thereof.

The storage/memory 204 is any conventional storage media. The storage/memory 204 stores machine executable instructions for execution by the CPU 202, to perform the disclosed processes. The storage/memory 204 also includes machine executable instructions associated with the operation of the components, including the databases 211 and storage media 212, the isolation module 221, the tagging module 222, the search and normalization module 223, and the permission model 231. The storage/memory 204 also, for example, stores rules and policies for the system 102' and the main server 102. The processors of the CPU 202 and the storage/memory 204, although shown as a single component for representative purposes, may be multiple components, and may be outside of the main server 102 and/or the system 102', and linked to the main server 102 and/or system 102' via the communications network 100.

Figure 3:
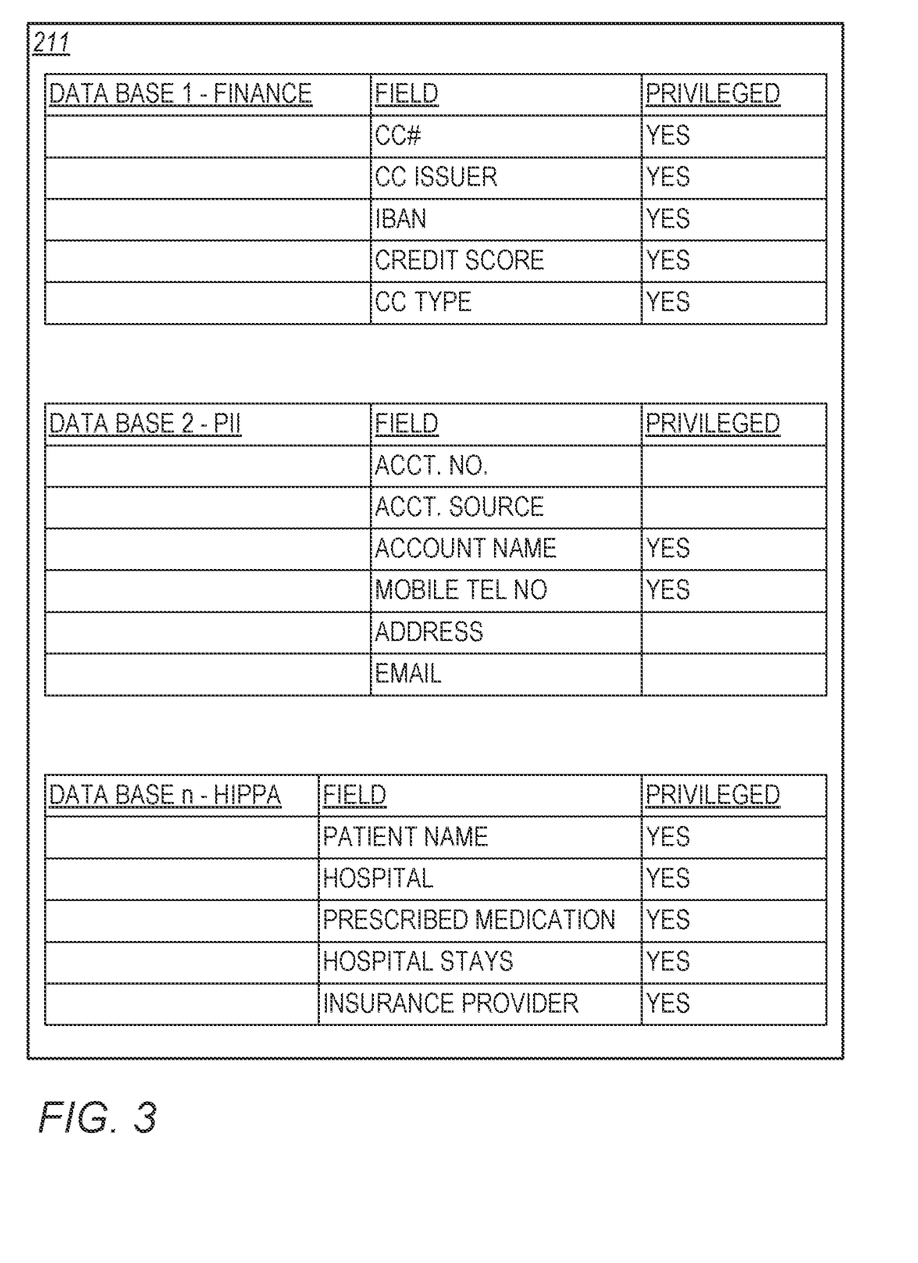
FIG. 3 is a diagram of a database showing classification of data.

The database 211 provides classification into groups, and each group includes designated fields, as well as indicators of various criteria for the field and the data assets therein, for example, that the field is sensitive and/or privileged. For example, as shown in FIG. 3, a sampling of groups with individual fields and the sensitive/privileged or non-sensitive designation of the field. In FIG. 3, for the group "Financial", CC #(Credit Card Number), CC (Credit Card) Issuer, and IBAN, are sensitive and access thereto is privileged. Similarly, for example, in the "Personal Identification Information (PII)" group, the Account Name and Mobile Telephone Number fields are sensitive, and access thereto is privileged.

Returning to FIG. 2, the storage media 212 provides storage for data assets, both tagged and untagged, from the various platforms, as detailed below.

The data asset isolator or data asset isolation module 221 functions to identify and isolate data assets in the various platforms 106a-106n.

The tagger or tagging module 222 operates on the identified and isolated data assets obtained from each of the analyzed platforms 106a-106n by tagging them for various criteria, for example, being sensitive or privileged. This module 222 operates in conjunction with the database 211 to determine which data assets are to be tagged, based on the data asset meeting one or more criterion, such as sensitive/privileged, such that access should be provided to these fields/data assets to a limited number of users (entities) in the enterprise 110.

The searching/normalization module 223 obtains the tagged data assets from one of the platforms, e.g., PLATFORM 1 106a (a "source of truth" platform), and based on the representation terms and/or content of the data asset, examines the data assets in other or subsequent platforms e.g., PLATFORM 2 to PLATFORM n 106b-106n, to identify data assets corresponding, including matching, equivalent, approximately equivalent or congruent, (e.g., the equivalence, approximate equivalence or congruency programmed into the system 102' and/or determined by a system administrator, or the like) to the tagged data assets including representation terms and/or content thereof.

The permission model 231 analyzes privileges for the respective data assets and users with privileges to each of the data assets for one platform, e.g., PLATFORM 1 106a, and suggests rules to users of other platforms, e.g., PLATFORM 2 to PLATFORM n 106b-106n, who were found to have access to corresponding privileged data assets in the other platforms 106b-106n.

Figure 4:
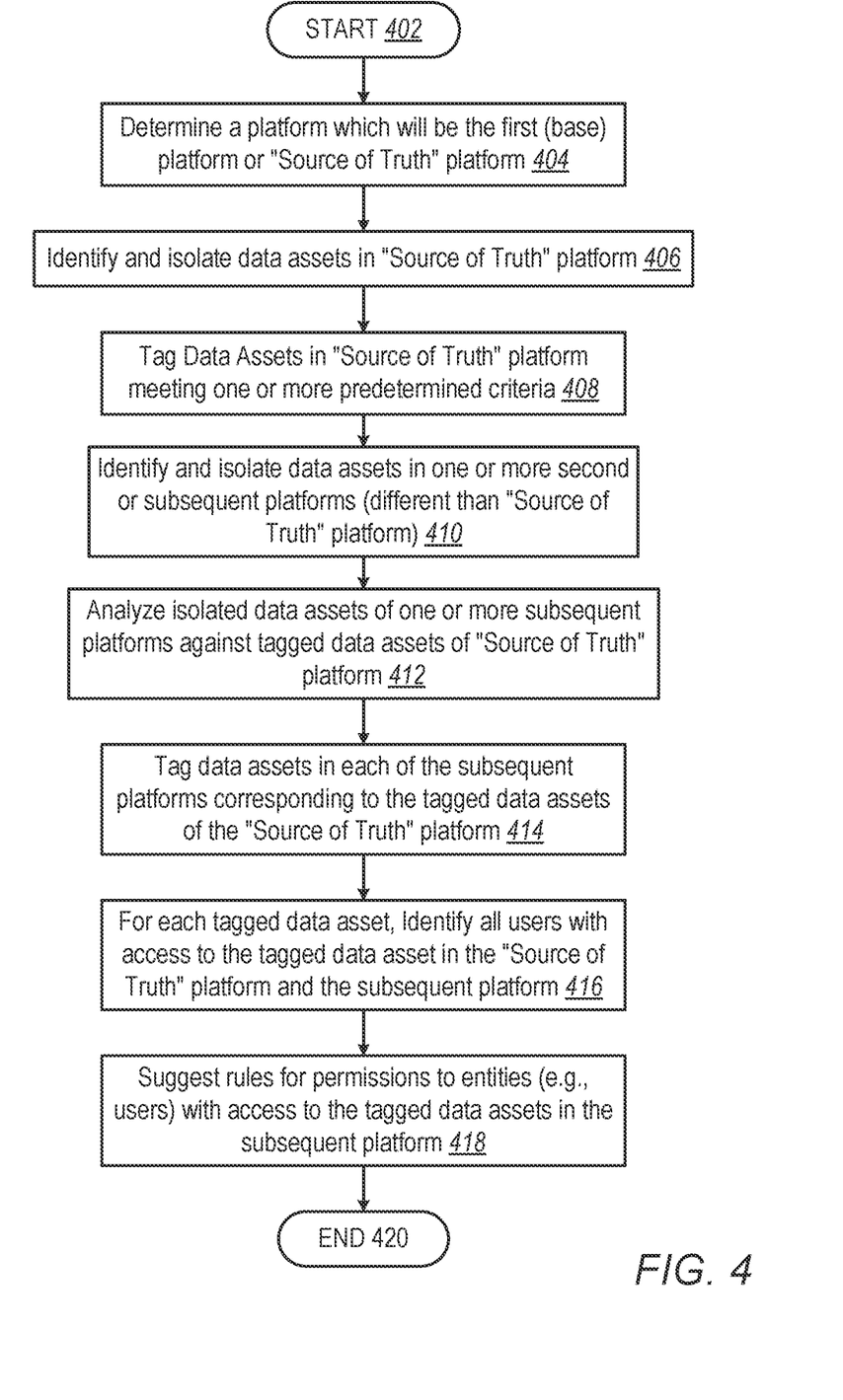
FIG. 4 is a flow diagram of an example process in accordance with embodiments of the disclosed subject matter.

Attention is now directed to FIG. 4, which shows a flow diagram detailing computer-implemented processes in accordance with embodiments of the disclosed subject matter. Reference is also made to elements shown in FIGS. 1A, 1B, 2, and 3. FIGS. 5A-5F are diagrams graphically illustrating the various processes and/or subprocesses of the flow diagram of FIG. 4. The process and sub-processes of FIG. 4 are computerized processes performed by the system 102'. The aforementioned processes and sub-processes may be, for example, performed automatically, and, for example, in real time.

At a START block 402, the system 102' is active and running at least two platforms, such as SAAS platforms PLATFORM 1 and PLATFORM 2, of FIGS. 5A-5D.

Figure 5A:
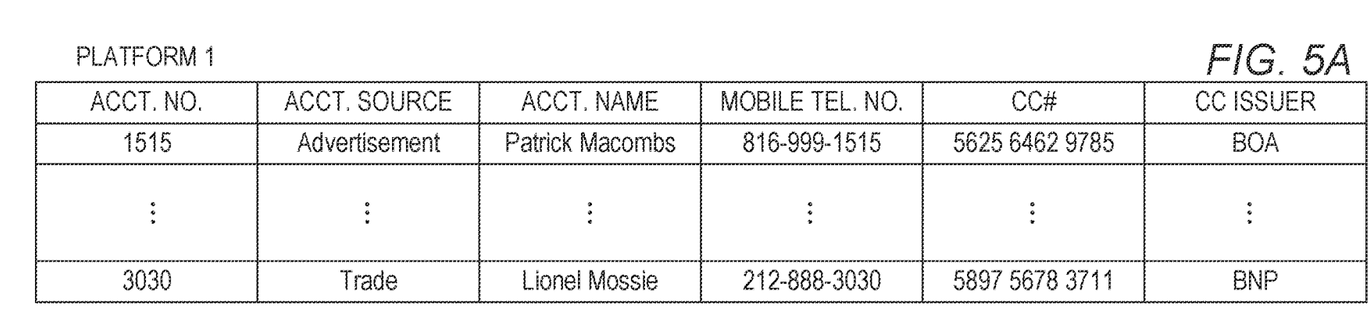
FIGS. 5A-5F are diagrams of platforms used to illustrate the processes of FIG. 4, in accordance with embodiments of the disclosed subject matter.
Figure 5B:
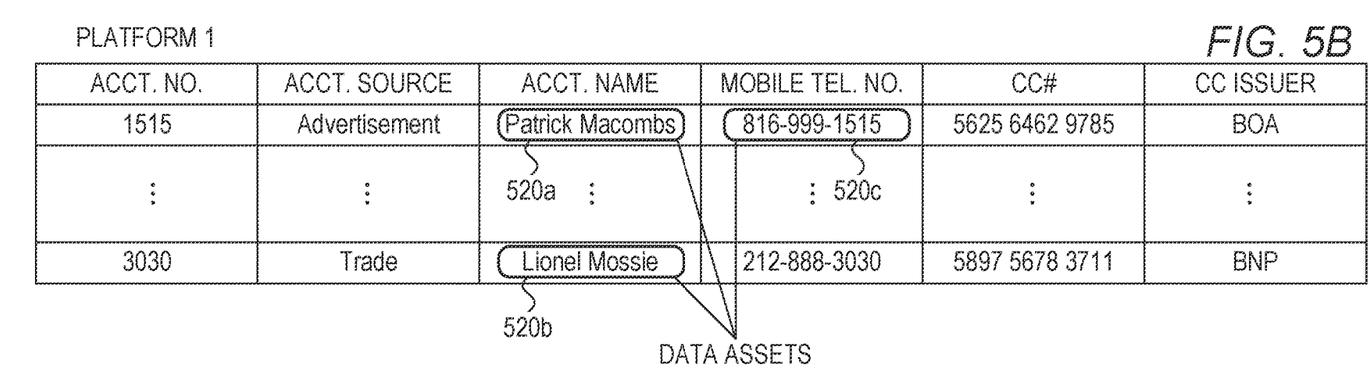

The process moves to block 404, where one platform, for example, PLATFORM 1, shown in FIG. 5A is considered the base or first platform, or "Source of Truth". At block 406, the data asset isolation module 221 is used to identify and isolate data assets in PLATFORM 1 (example data assets are indicated by element numbers 520a, 520b and 520c), as shown in FIG. 5B.

Figure 5C:
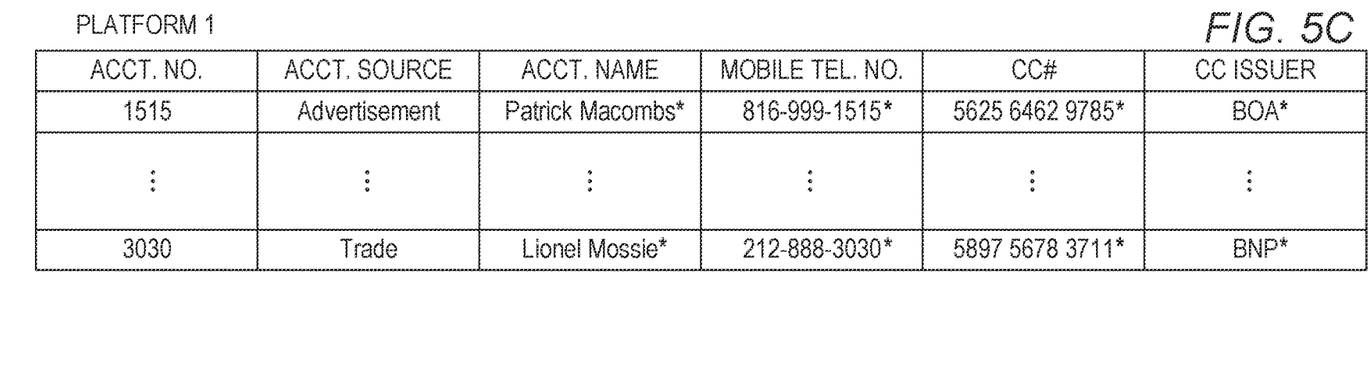

Using the tagging module 222, the database 211 of the group classification, for example, the database 211 shown in FIG. 3, is searched to determine whether the data asset meets one or more criterion to be tagged, at block 408. For example, the data asset is tagged as it meets the criterion (e.g., a predetermined criterion) of "privileged", in accordance with the group and classification therein, in the database 211. As shown in FIG. 5C, the PII data assets in the field "ACCT. NAME" and "MOBILE TEL. No." are considered privileged, as per the database 211, and are tagged. The tag is indicated by a star (*). Similarly, the FINANCIAL fields "CC #" and "CC ISSUER" are privileged, and the data assets from these fields are also tagged, the tag indicated by a star (*).

Figure 5D:
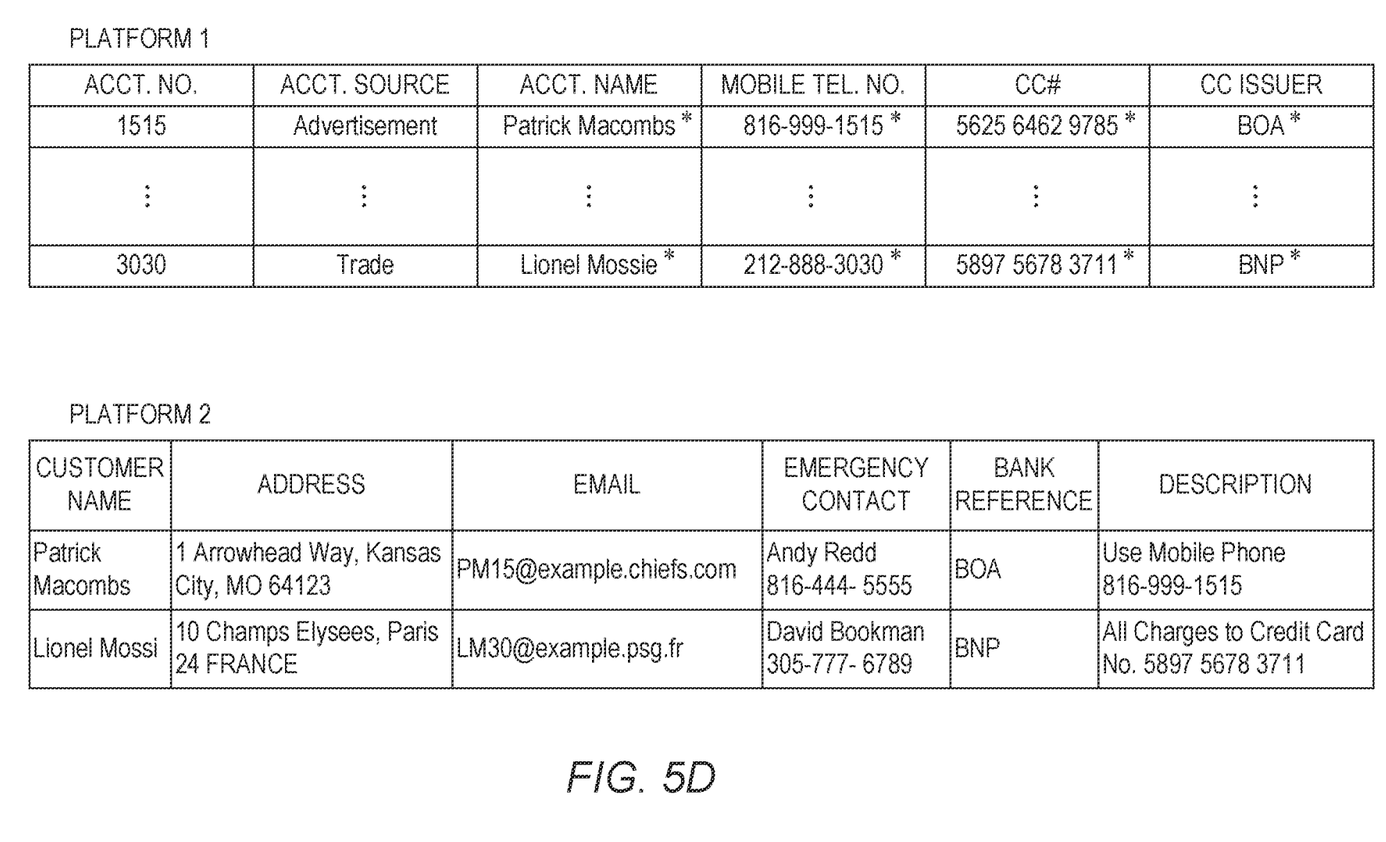
Figure 5E:
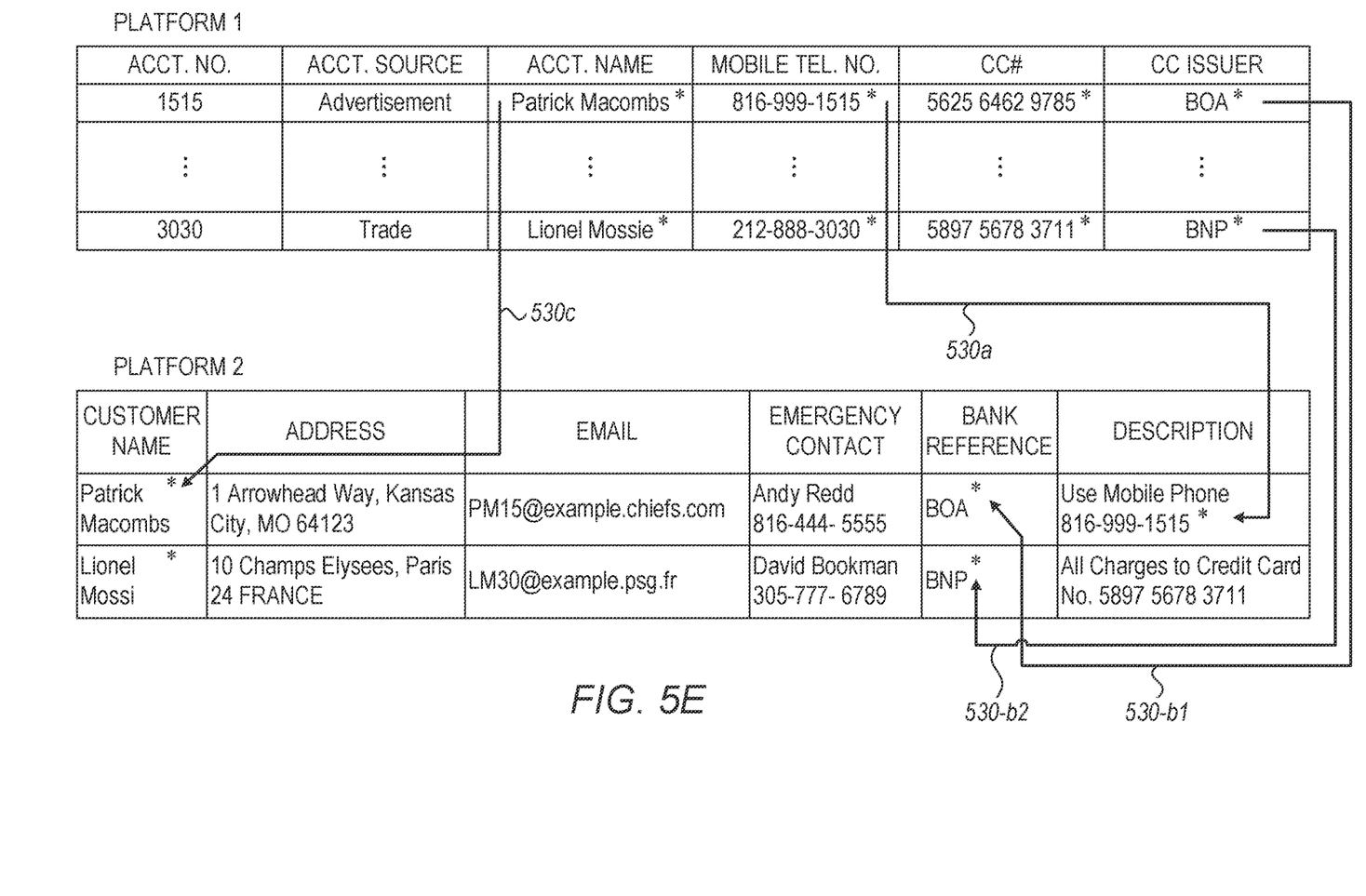

Moving to block 410, in a second or subsequent platform (different from the "source of truth" platform), i.e., PLATFORM 2, data assets in PLATFORM 2 are identified and isolated, for example, by the module 221. These identified data assets from PLATFORM 2 are now analyzed against the data assets, tagged and untagged, of PLATFORM 1, for correspondence, at block 412, and as shown in FIG. 5D.

Moving to block 414, based on the representation terms or content of the data assets in the first platform, PLATFORM 1, the data assets of PLATFORM 2 which match or otherwise correspond in representation terms and content to a tagged (as privileged) data asset from PLATFORM 1, are tagged, for example, as privileged. This is shown as an example, in FIG. 5E, as the data asset from PLATFORM 1 with the content 816-999-1515 in the field MOBILE TEL. NO. was found in PLATFORM 2 as a data asset under the field DESCRIPTION, as per the arrow 530a. Similarly, the PLATFORM 1 data assets of BOA and BNP, from the field "CC ISSUER", were found in PLATFORM 2, as indicated by the arrows 530b-1 and 530b-2 to the field "BANK REFERENCE", and the field with the including the term "NAME" identified in PLATFORM 2, as indicated by the arrow 530c.

Figure 5F:
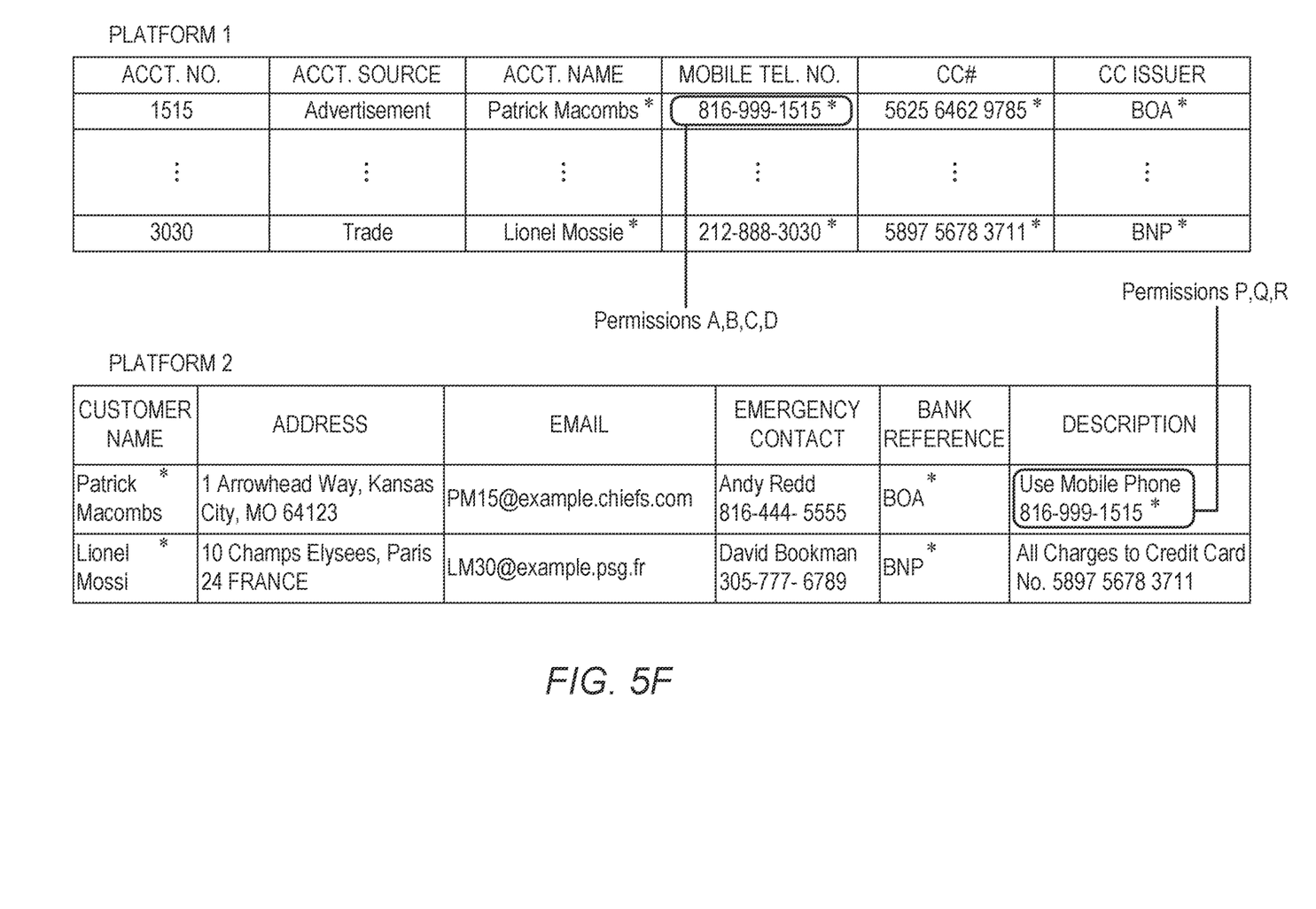

Moving to block 416, for a particular data asset from PLATFORM 1 and PLATFORM 2, the entities (e.g., users) with privileges (e.g., access) to the data asset (e.g., tagged data asset) are identified. As shown in FIG. 5F, for the data asset "816-999-1515" from PLATFORM 1 is accessible to entities (users) A, B, C and D. The same data asset in PLATFORM 2 is accessible by entities (users) P, Q and R. For example, entities A, B, C, D, P, Q and R all have permission, such as access to the tagged data asset MOBLLE TEL. NO. 816-999-1515, which is the mobile phone number of Patrick Macombs, an Account of PLATFORM 1, and a Customer of PLATFORM 2.

The process now moves to block 418, where permissions rules are suggested for entities (users) with privileges to the tagged data asset in the subsequent platform(s). The permissions rules may, for example, be rules for access (access rules) for the data in the particular data field. For example, the suggested rules for the permissions to the tagged data asset in the subsequent platforms (e.g., PLATFORM 2), for the entity/entities (user (s)) are typically the rules which correspond, and typically match the rules for permission for the entities (users) of the corresponding tagged data asset of the first or "Source of Truth" platform, e.g., PLATFORM 1.

Optionally, the suggested rules may be enforced and/or adopted by the enterprise across all or some of its platforms, e.g., SAAS platforms.

The process moves to block 420, where it ends. The process may be repeated for as long as desired.

The disclosed subject matter is directed to a method, including a computerized method, for providing access to data between a plurality of platforms. The method comprises: in a first platform, identifying one or more data assets; tagging each identified data asset from the first platform which meets a predetermined criterion; in one or more subsequent platforms, identifying the one or more data assets; for the data assets in the one or more subsequent platforms corresponding to the tagged data assets of the first platform, tagging the corresponding data assets of the one or more subsequent platforms; for each tagged data asset in the first platform and the corresponding tagged data asset from the one or more subsequent platforms, identifying the entities with permissions for the tagged data asset; and, for the tagged data asset in the one or more subsequent platforms, providing a suggestion of one or more rules for permissions to the tagged data asset, for the entities having permissions to the tagged data asset in the one or more subsequent platforms.

Optionally, the method is such that the providing the suggestion of one or more rules for permissions to the entities with permissions to the tagged data asset in the one or more subsequent platforms, includes, suggesting rules which correspond to the rules for permissions to the tagged data assets for entities with permissions to the tagged data asset in the first platform.

Optionally, the method is such that the permissions include access to the tagged data asset.

Optionally, the method is such that the plurality of platforms includes software as a Service (SAAS) platforms. Optionally, the method is such that the data assets in the one or more subsequent platforms corresponding to the tagged data assets of the first platform include the data assets which are either a representation term or content match with the tagged data assets of the first platform.

Optionally, the method is such that the corresponding data assets of the one or more subsequent platforms include matching data assets in the first platform.

The disclosed subject matter is directed to a system for providing access to data between a plurality of platforms. The system comprises: a non-transitory storage medium for storing computer components; and a computerized processor for executing the computer components. The computer components comprise: an identifying module for identifying one or more data assets in one or more data platforms; a tagging module for tagging: 1) each identified data asset from a first data platform which meets a predetermined criterion, and 2) data assets in one or more subsequent data platforms corresponding to the tagged data assets of the first data platform; a searching module for searching for data assets in the subsequent data platforms corresponding to the tagged data assets in the first data platform; an identifying module for identifying the entities with permissions for: 1) the tagged data asset in the first data platform, and 2) the corresponding tagged data asset in the one or more subsequent data platforms; and, a permission model for providing suggested rules for permissions for the entities to the tagged data assets in the one or more subsequent data platforms.

Optionally, the system is such that the permission model for providing the suggested rules which correspond to the rules for permissions to the entities to the corresponding tagged data asset include the permissions to the tagged data asset in the first data platform.

Optionally, the system is such that the rules for permissions include rules for access to the tagged data asset.

Optionally, the system is such that the data platforms include software as a service (SAAS) platforms.

Optionally, the system is such that the corresponding data assets of the one or more subsequent data platforms include matching data assets in the first platform.

The implementation of the method and/or system of examples of the disclosure can involve performing or completing selected tasks manually, automatically, or a combination thereof. Moreover, according to actual instrumentation and equipment of examples of the method and/or system of the disclosure, several selected tasks could be implemented by hardware, by software or by firmware or by a combination thereof using an operating system or a cloud-based platform.

For example, hardware for performing selected tasks according to examples of the disclosure could be implemented as a chip or a circuit. As software, selected tasks according to examples of the disclosure could be implemented as a plurality of software instructions being executed by a computer using any suitable operating system. In an exemplary example of the disclosure, one or more tasks according to exemplary examples of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed examples of the present disclosure. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various examples of computer-implemented methods are provided herein, some of which can be performed by various examples of apparatuses and systems described herein and some of which can be performed according to instructions stored in non-transitory computer-readable storage media described herein. Still, some examples of computer-implemented methods provided herein can be performed by other apparatuses or systems and can be performed according to instructions stored in computer-readable storage media other than that described herein, as will become apparent to those having skill in the art with reference to the examples described herein. Any reference to systems and computer-readable storage media with respect to the following computer-implemented methods is provided for explanatory purposes and is not intended to limit any of such systems and any of such non-transitory computer-readable storage media with regard to examples of computer-implemented methods described above. Likewise, any reference to the following computer-implemented methods with respect to systems and computer-readable storage media is provided for explanatory purposes and is not intended to limit any of such computer-implemented methods disclosed herein.

The flowchart and block diagrams in the Figures illustrate the architecture, functionality, and operation of possible implementations of systems, methods and computer program products according to various examples of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. The descriptions of the various examples of the present disclosure have been presented for purposes of illustration but are not intended to be exhaustive or limited to the examples disclosed. Many modifications and variations will be apparent to those of ordinary skill in the art without departing from the scope and spirit of the described examples.

As used herein, the singular form "a", "an" and "the" include plural references unless the context clearly dictates otherwise.

It is appreciated that certain features of the disclosure, which are, for clarity, described in the context of separate examples, may also be provided in combination in a single example. Conversely, various features of the disclosure, which are, for brevity, described in the context of a single example, may also be provided separately or in any suitable sub-combination or as suitable in any other described example of the disclosure. Certain features described in the context of various examples are not to be considered essential features of those examples, unless the example is inoperative without those elements.

The above-described processes including portions thereof can be performed by software, hardware and combinations thereof. These processes and portions thereof can be performed by computers, computer-type devices, workstations, cloud-based platforms, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these examples to practice without undue experimentation. The processes (methods) and systems have been described in a manner sufficient to enable persons of ordinary skill in the art to readily adapt other hardware and software as may be needed to reduce any of the examples to practice without undue experimentation and using conventional techniques.

Descriptions of examples of the disclosure in the present application are provided by way of example and are not intended to limit the scope of the disclosure. The described examples comprise different features, not all of which are required in all examples of the disclosure. Some examples utilize only some of the features or possible combinations of the features. Variations of examples of the disclosure that are described, and examples of the disclosure comprising different combinations of features noted in the described examples, will occur to persons of the art. The scope of the disclosure is limited only by the claims.

It will thus be appreciated that the examples described above, do not limit the disclosed subject matter to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for providing access to data between a plurality of platforms comprising:
    in a first platform, identifying one or more data assets;
    tagging each identified data asset from the first platform which meets a predetermined criterion;
    in one or more subsequent platforms, identifying the one or more data assets;
    for the data assets in the one or more subsequent platforms corresponding to the tagged data assets of the first platform, tagging the corresponding data assets of the one or more subsequent platforms;
    for each tagged data asset in the first platform and the corresponding tagged data asset from the one or more subsequent platforms, identifying entities with permissions for the tagged data asset; and
    for the tagged data asset in the one or more subsequent platforms, providing a suggestion of one or more rules for permissions to the tagged data asset, for the entities having permissions to the tagged data asset in the one or more subsequent platforms.

2. The method of claim 1, wherein the providing the suggestion of one or more rules for permissions to the entities with permissions to the tagged data asset in the one or more subsequent platforms, includes, suggesting rules which correspond to the rules for permissions to the tagged data assets for entities with permissions to the tagged data asset in the first platform.

3. The method of claim 2, wherein the permissions include access to the tagged data asset.

4. The method of claim 1, wherein the plurality of platforms includes Software As A Service (SAAS) platforms.

5. The method of claim 1, wherein the data assets in the one or more subsequent platforms corresponding to the tagged data assets of the first platform include the data assets which are either a representation term or content match with the tagged data assets of the first platform.

6. The method of claim 1, wherein the corresponding data assets of the one or more subsequent platforms include matching data assets in the first platform.

7. A system for providing access to data between a plurality of platforms comprising:
    a non-transitory storage medium for storing computer components; and
    a computerized processor for executing the computer components comprising:
        an identifying module for identifying one or more data assets in one or more data platforms;
        a tagging module for tagging: 1) each identified data asset from a first data platform which meets a predetermined criterion, and 2) data assets in one or more subsequent data platforms corresponding to the tagged data assets of the first data platform;
        a searching module for searching for data assets in the subsequent data platforms corresponding to the tagged data assets in the first data platform;
        an identifying module for identifying entities with permissions for: 1) the tagged data asset in the first data platform, and 2) the corresponding tagged data asset in the one or more subsequent data platforms; and
        a permission model for providing suggested rules for permissions for the entities to the tagged data assets in the one or more subsequent data platforms.

8. The system of claim 7, wherein the permission model for providing the suggested rules which correspond to the rules for permissions to the entities to the corresponding tagged data asset include the permissions to the tagged data asset in the first data platform.

9. The system of claim 8, wherein the rules for permissions include rules for access to the tagged data asset.

10. The system of claim 8, wherein the data platforms include Software As A Service (SAAS) platforms.

11. The system of claim 7, wherein the corresponding data assets of the one or more subsequent data platforms include matching data assets in the first platform.

* * * * *